Aug. 28, 1973   E. C. McKAY   3,755,524
METHOD FOR MAKING PIPE REDUCERS
Filed Oct. 26, 1970
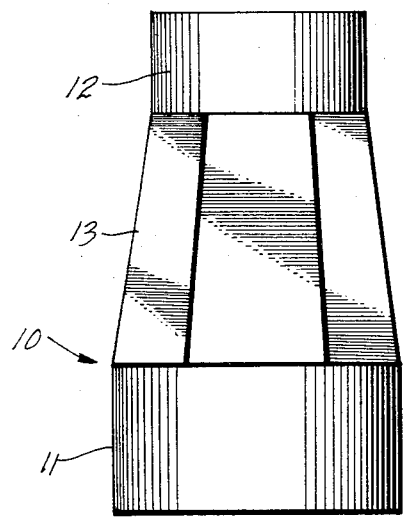
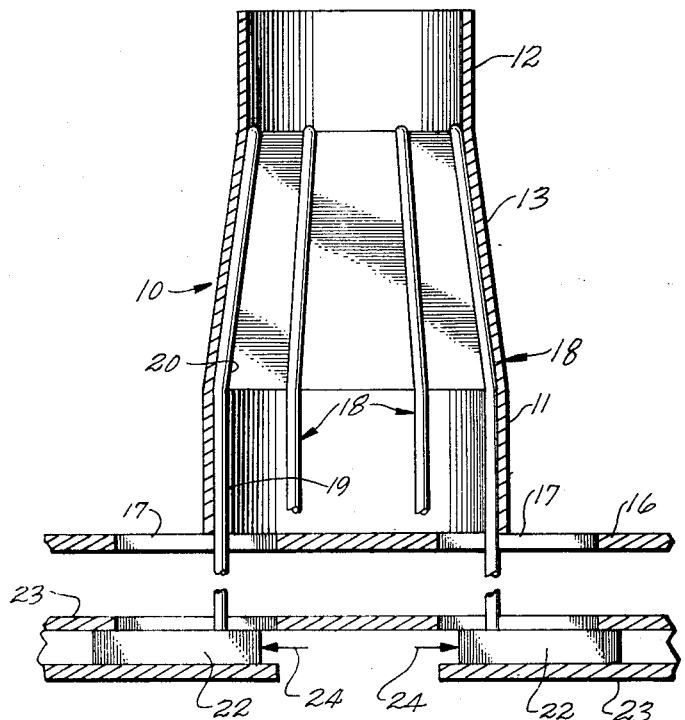
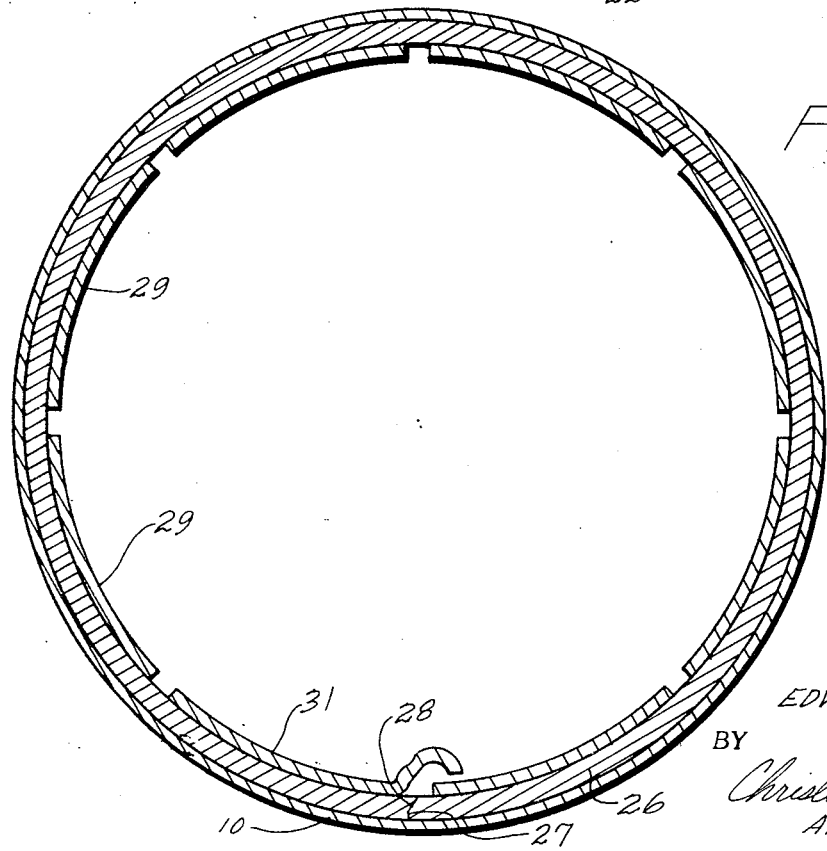
INVENTOR.
EDWIN C. McKAY
BY
Christie, Parker, & Hale
ATTORNEYS United States Patent Office 3,755,524
Patented Aug. 28, 1973

3,755,524
METHOD FOR MAKING PIPE REDUCERS
Edwin C. McKay, Fresno, Calif., assignor to Climate Conditioning Corporation, Stanton, Calif.
Filed Oct. 26, 1970, Ser. No. 83,920
Int. Cl. B29c 17/02
U.S. Cl. 264—138
2 Claims

ABSTRACT OF THE DISCLOSURE

A method is described for making plastic pipe reducers, such as, for example, for large diameter polyvinyl chloride irrigation pipe employing the shape memory of extruded plastic irrigation pipe to full advantage. An appropriate length of extruded plastic pipe having a diameter approximately that of the smaller reducer diameter is cut from a length of extruded plastic pipe. A sufficient length of the cut piece to form the larger diameter end and the transition to the smaller diameter end is heated to the softening temperature of the thermoplastic material. Longitudinally extending fingers are forced radially outwardly to expand the length of pipe polygonally into the transition portion, and the pipe is cooled in its expanded condition. A circular mold having an outside diameter the same as the relatively larger inside diameter of the reducer is inserted in the expanded end, and that portion adjacent the mold is heated to the softening temperature of the plastic so that the shape memory of the plastic shrinks the material onto the mold. The mold is removed after the plastic material is cooled. A similar molding technique is employed for the smaller diameter end of the reducer, either before or after the larger end is formed.

BACKGROUND

In large-scale irrigation systems, water in large volumes is conveyed at relatively low pressures. For many years, it has been the practice to convey water in concrete pipes; however, in recent years it has been found that it is more convenient and economical in many circumstances to employ plastic pipe such as polyvinyl chloride (PVC). This plastic irrigation pipe is commonly used in size ranges from 6 to 18 inches and, in some circumstances, larger and smaller diameters. The PVC pipe is lightweight, somewhat flexible and does not deteriorate in use, and, hence, has become widely accepted for irrigation.

Plastic irrigation pipe is commonly employed in long lengths with various conventional style plastic fittings, preferably solvent welded in place. This technique commonly employs a fitting, such as a coupling, reducer, T elbow, or the like, having an inside diameter only slightly larger than the outside diameter of the pipe. The fitting is placed over the end of the pipe and the interface between the pipe and fitting contains a cement including a solvent for the plastic material forming the pipe and fitting. This solvent dissolves a portion of the plastic and forms a tight "weld" between the two pieces capable of withstanding the contained pressure within the pipe without leaking.

The plastic pipe is quite inexpensive since it is extruded in great lengths and is, therefore, quite cheap to manufacture. Fittings suitable for use with the plastic irrigation pipe are, however, more expensive since they are individually made. Individual fittings can be made by closed mold forming, and this is commonly done for small-size fittings; however, such a fabrication technique is prohibitively expensive for large diameter plastic irrigation pipe. It is preferable to form pipe fittings from short sections of extruded pipe.

The properties of PVC and other available thermoplastic materials are well suited to fabrication of fittings from sections of pipe. These materials have a property known as elastic or shape memory, which manifests itself in the following manner: a plastic article is originally formed, such as, for example, by extrusion to a particular size and shape. If it is thereafter heated to softening and deformed, it "remembers" its original shape and tends to return to that shape and size even though nominally thermoplastic. The property of shape memory is employed, for example, to make pipe couplings or well ends on pipes. In order to do this, the pipe is heated and stretched slightly with a mold having an outside diameter larger than the original diameter of the pipe by an amount corresponding to the wall thickness. The heated pipe tends to return to its original size and thereby fits tightly on the mold so that after cooling it has a suitable inside diameter to fit over an end of extruded pipe. Extruded plastic irrigation pipe is available in certain standard sizes, such as, for example, 6, 8, 10, 12 or 15 inches diameter. Pipe reducers are employed for transition from one diameter pipe to another diameter, and for best economy it is preferred to fabricate the reducers from short lengths of extruded plastic pipe.

BRIEF SUMMARY OF THE INVENTION

Thus, in practice of this invention according to a preferred embodiment there is provided a method for fabricating pipe reducers of thermoplastic material having shape memory including the steps of expanding a length of pipe having the relatively smaller reducer diameter to a size larger than the larger reducer diameter, cooling the pipe in the expanded condition, inserting a circular mold in the expanded portion and heat shrinking the expanded portion on the circular mold.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates a pipe reducer constructed according to principles of this invention;

FIG. 2 illustrates schematically apparatus for expanding a reducer in practice of this invention; and FIG. 3 illustrates in cross section a circular mold in place in the reducer during a finishing step.

Throughout the drawings like numerals refer to like parts.

DESCRIPTION

FIG. 1 illustrates in elevation a typical plastic pipe reducer 10 constructed according to principles of this invention. The relative proportions of the reducer illustrated are those of one for reducing from a nominal eight inch to a nominal six inch pipe. Thus, the reducer has a larger end 11 having an inside diameter D slightly larger than the outside diameter of a nominal eight inch plastic irrigation pipe (typically 0.005 inch clearance is provided for solvent cement). The cylindrical portion 11 to fit over the larger pipe size has a length of ½ D, that is, for example, for a nominal eight inch pipe the length of the cylindrical large diameter end adapted to fit on a pipe is four inches. Similarly, in a 15 inch to 12 inch reducer, the diameter D is nominally 15 inches and the length of the cylindrical end portion is about 7½ inches.

At the opposite end of the reducer 10 is a cylindrical portion having an inside diameter d adapted to fit over a smaller diameter plastic irrigation pipe. The length of the smaller cylindrical portion 12 is approximately ½ D, such as, for example, three inches for an eight inch to six inch reducer, or six inches for a fifteen to twelve inch reducer.

In between the two cylindrical ends 11 and 12 is a tapered or flared transition portion 13 having a polygonal cross section with, for example, six or eight sides. The larger end of the polygonal section 13 blends into the larger cylindrical portion 11, and the smaller end of the flared transition section blends into the smaller diameter cylindrical portion 12. Preferably, the flared transition section 13 is in the range of from about six to eight inches long. If the transition section is less than about six inches long, difficulty may be encountered in forming the section and in providing a smooth blending to the cylindrical ends. There is no substantial reason for increasing the length of the transition section above about eight inches and any increase merely unnecessarily lengthens the reducer.

In order to make a pipe reducer such as illustrated in FIG. 1, the first step is to cut a selected length of plastic pipe suitable for the finished reducer from a section of plastic irrigation pipe having a nominal diameter substantially the same as that of the smaller end of the reducer. Thus, for example, in order to make an eight to six inch reducer, a piece of six inch extruded plastic irrigation pipe fourteen inches long is cut. If a twelve to ten inch reducer is being made, an eighteen inch piece of nominal ten inch diameter plastic irrigation pipe is cut. Plastic irrigation pipe is readily cut with a conventional handsaw or the like, or power equipment can be employed if desired.

The piece of plastic pipe is then immersed in an oil bath (not shown) to a depth corresponding to the length of the transition section plus the larger diameter end section, that is, ½ D plus seven inches. The oil bath is maintained at a temperature within the softening range of the thermoplastic material forming the plastic irrigation pipe. Thus, for example, with polyvinyl chloride, the oil bath is maintained at a temperature in the range of from about 300 to 325° F. This heating step softens the thermoplastic material forming the pipe. The softened pipe is then placed on an expanding machine, such as, for example, an apparatus as illustrated schematically in FIG. 2.

An expanding apparatus for a pipe reducer can take many forms as will be apparent to one skilled in the art. FIG. 2 illustrates schematically a suitable variety of expanding apparatus for the softened thermoplastic pipe. As illustrated in this arrangement, the apparatus comprises a table top 16 or similar horizontal surface having a plurality of radiating slots 17 extending through the surface. Extending upwardly through the slots 17 are a plurality of rods or fingers 18, one such forming finger for each corner of the polygonal transition section 13 of the reducer. Thus, for example, if the transition section is octagonal, eight fingers are provided. Each of the forming fingers 18 has a substantially vertical section 19 extending through the tabletop 16, and an inwardly bent portion 20 nearer the upper free end. The bent portion 20 is in the order of 7 or 8 inches and is angled appropriately for forming the desired taper in the transition section.

The lower ends 19 of the fingers are connected to guides 22, either rectangular or circular in cross section, which are slidably mounted in radially extending tracks 23. Preferably, the guides 22 are mounted on low friction bearings in the tracks 23, such as, for example, ball bearings, in order to move freely in the apparatus in their respective radial directions. Means are also provided in the apparatus for applying a force as indicated by the arrows 24 radially outwardly on the guides 22. In a preferred embodiment the means for providing the force 24 is a pneumatic cylinder; however, it will be apparent that hydraulic, electrical, or mechanical devices may also be employed as desired. Preferably, the tracks 23, in which the guides 22 are mounted and from which the fingers 18 extend, are mounted for vertical adjustment relative to the tabletop 16 so that the extent of the fingers above the tabletop can be adjusted. This is convenient so that different size pipe reducers can be made on the same expanding apparatus. Similarly, as desired, adjustable stops (not shown) can be provided for the guides 22 or fingers 18 for limiting the radial stroke.

In order to employ the apparatus illustrated in FIG. 2, the forming fingers 18 are brought to the inner end of their stroke so that the vertical portion 19 of the several fingers will fit within the inside diameter of a piece of pipe from which a reducer is to be made. The heat softened length of plastic pipe is then placed over the forming fingers 18 and the forces 24 applied to move the fingers radially outwardly, thereby stretching the softened plastic between the fingers 18 and forming the flat polygonal sides of the transition section 13. The larger end of the reducer is also expanded by the fingers 18 to an exent that the distance across the flats of the stretched polygon is at least as great as the desired inside diameter of the finished reducer. As soon as the reducer is expanded on the apparatus as illustrated in FIG. 2, the plastic is cooled, such as, for example, by spraying with cold water, and the fingers are retracted inwardly so that the reducer 10 in its intermediate shape can be removed from the expanding apparatus.

By using a plurality of separate fingers for expanding the tapered transition section, fairly uniform stretching of the plastic is obtained. Because of friction between the plastic and the fingers, stretching is less in the region in contact with the fingers than it is therebetween. Widely spaced fingers of relatively small diameter are therefore preferred so that the greatest possible portion of the plastic is between fingers for uniform stretching.

A cylindrical mold such as that illustrated in cross section in FIG. 3 is next inserted into the enlarged end of the reducer. As illustrated in this embodiment, the cylindrical mold comprises a stainless steel ring 26 having an outside diameter equal to the desired inside diameter of the cylindrical portion of the reducer. The length of the cylindrical mold is at least ½ the diameter, and the mold may also include a flange (not shown) for limiting the depth of insertion into the end of the reducer. The cylindrical ring 26 is longitudinally slit at one point along a line 27 on a cylinder radius for about ½ the thickness of the cylinder. The balance of the slit is along a line 28 at an angle of about 30° to a cylinder radius. Although the cylindrical ring 26 is made of ³⁄₁₆ or ¼-inch-thick stainless steel, it has been found desirable to weld reinforcing cylindrical segments 29 on the inside surface of the cylinder to maintain the circular cross section of the cylinder for prolonged use. One of the segments 31 adjacent the longitudinally extending slit is provided with an edge rib 32 having a hook-like cross section along one edge lapping over the slit.

In order to employ the cylindrical end mold, it is inserted in the expanded polygonal end of the semi-finished reducer and the end is then immersed in a heated oil bath to a depth corresponding to the length of the cylindrical mold 26. The shape memory of the heated thermoplastic material draws the end of the reducer 10 tightly against the outside diameter of the mold so that the inside diameter of the reducer is the outside diameter of the mold. When the cylindrical mold is inserted in the semi-finished reducer, the longitudinal slit 27, 28 normally gaps open a small amount; however, the force exerted by the shrinking plastic draws the slit closed and assures that the mold is exactly cylindrical.

After the reducer has shrunk onto the mold, which occurs as soon as it is heated, the reducer is removed from the oil bath and cooled, either by spraying or immersion in water. The cylindrical mold is then removed by twisting a screwdriver or similar tool under the hook-shaped rib 32 so that the end of the cylindrical section on one side of the slit 27, 28 rides over the other side, thereby reducing the diameter of the mold and permitting it to be readily withdrawn from the finished reducer.

After the larger diameter end has been made cylindrical, as hereinabove described, a similar mold may be employed at the smaller end of the reducer to properly size it for placing over a standard plastic irrigation pipe. With the relatively slight stretch of the small end, it can be heated and manually stretched enough to fit a cylindrical mold therein. It will be apparent that the step of forming the smaller end of the reducer to the finished size can be performed either before or after the other steps of the forming process as may be desired.

It should also be recognized that the reducer illustrated in FIG. 1 is somewhat idealized in that a slight peripheral contraction often occurs at the line between the larger cylindrical end 11 and the transition section 13. Occasionally such an inward peripheral groove occurs at the smaller end of the transition section due to a small amount of shrinkage occurring adjacent the heated region in which the mold is inserted. The slight contraction is due to heating in regions not constrained by the molds, and is of no serious consequence. The flow rate of water through plastic irrigation pipe is not extremely high and minor surface irregularities do not unduly impede flow.

Although but one series of instrumentalities for performing the method of this invention has been set forth in detail, many modifications and variations will be apparent to one skilled in the art. Thus, for example, a quite different apparatus for stretching the transition section can be used or variations can be made in design of the cylindrical molds. It is, therefore, to be understood that within the scope of the appended claims the invention may be practiced otherwise than as specifically described.

What is claimed is:

1. A method for forming a large diameter plastic pipe reducer;

the reducer having a relatively smaller inside diameter at one end, a relatively larger inside diameter at the other end, and a tapered transition therebetween, comprising the steps of:

cutting a length of plastic pipe made of thermoplastic material having a shape memory and having an outside diameter approximately the same as the smaller inside diameter of the reducer, to a length approximately equal to ½ the relatively smaller inside diameter, plus ½ the relatively larger inside diameter, plus more than about six inches;

immersing more than about six inches plus ½ the larger inside diameter of the length of pipe into a liquid at a temperature in the softening range of the thermoplastic material;

placing a plurality of longitudinally extending fingers having a substantially vertical portion and an upper inwardly bent portion within the heated portion of said pipe;

forcing said longitudinally extending fingers radially outwardly in the heated portion for stretching the thermoplastic material into a central portion having a tapered polygonal cross section and an end portion with a parallel walled polygonal cross section larger than the relatively larger inside diameter;

cooling the length of pipe in its expanded condition;

inserting a cylindrical mold in the larger end portion with an outside diameter the same as the relatively larger inside diameter of the reducer;

immersing only the end portion surrounding the cylindrical mold into a liquid at a temperature in the softening range of the thermoplastic material for shrinking onto the mold; and cooling the length of pipe while on the cylindrical mold.

2. A method as defined in claim 1 further comprising the steps of:

heating the relatively smaller diameter end of the reducer;

inserting a cylindrical mold with an outside diameter approximately the same as the relatively smaller inside diameter; and cooling the length of pipe with the cylindrical mold in place therein.

References Cited

UNITED STATES PATENTS

| | | | |
|---|---|---|---|
| 3,248,756 | 5/1966 | Mills et al. | 425—392 |
| 2,552,043 | 5/1951 | Horvath | 264—DIG. 73 |
| 2,671,889 | 3/1954 | Vickery | 264—230 |
| 3,347,970 | 10/1967 | Hanna | 264—230 |
| 3,377,414 | 4/1968 | Weyer | 264—230 X |
| 3,423,518 | 1/1969 | Weagant | 285—423 |
| 3,425,093 | 2/1969 | Ansette | 264—322 X |
| 3,249,671 | 5/1966 | Perrone et al. | 264—292 |
| 3,013,300 | 12/1961 | Gaenzle | 264—322 |
| 2,768,844 | 10/1956 | Schadeberg | 285—177 |
| 3,376,181 | 4/1968 | Larson et al. | 264—150 |

ROBERT F. WHITE, Primary Examiner

W. E. HOAG, Assistant Examiner

U.S. Cl. X.R.

264—230, 291, 296